United States Patent
Alizadeh Attar et al.

(10) Patent No.: US 9,590,914 B2
(45) Date of Patent: Mar. 7, 2017

(54) RANDOMIZED PER-PACKET PORT CHANNEL LOAD BALANCING

(71) Applicant: Cisco Technology, Inc., San Jose, CA (US)

(72) Inventors: Mohammadreza Alizadeh Attar, San Jose, CA (US); Sha Ma, San Jose, CA (US); Thomas J. Edsall, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/448,934

(22) Filed: Jul. 31, 2014

(65) Prior Publication Data

US 2015/0124614 A1 May 7, 2015

Related U.S. Application Data

(60) Provisional application No. 61/900,369, filed on Nov. 5, 2013.

(51) Int. Cl.
*H04L 12/863* (2013.01)
*H04L 12/803* (2013.01)
(Continued)

(52) U.S. Cl.
CPC ............. *H04L 47/50* (2013.01); *H04L 45/74* (2013.01); *H04L 45/7453* (2013.01); *H04L 47/125* (2013.01); *H04L 47/56* (2013.01); *H04L 49/25* (2013.01); *H04L 49/254* (2013.01); *H04L 61/6004* (2013.01); *H04L 61/6095* (2013.01); *H04L 67/22* (2013.01); *H04L 67/322* (2013.01); *H04L 69/167* (2013.01); *H04L 69/22* (2013.01); *H04L 61/103* (2013.01); *H04L 61/2084* (2013.01)

(58) Field of Classification Search
CPC ....... H04L 47/50; H04L 47/125; H04L 45/74; H04L 61/6004; H04L 61/6095; H04L 69/22; H04L 45/7453; H04L 49/25; H04L 69/167; H04L 61/2048; H04L 61/103
USPC .......................................... 370/235
See application file for complete search history.

(56) References Cited

U.S. PATENT DOCUMENTS 6,098,109 A * 8/2000 Kotzur ................. H04L 45/745
370/911
6,434,662 B1 8/2002 Greene et al.
(Continued)

*Primary Examiner* — Noel Beharry
*Assistant Examiner* — Ruihua Zhang
(74) *Attorney, Agent, or Firm* — Polsinelli PC

(57) ABSTRACT

Systems, methods, and non-transitory computer-readable storage media for per-packet load balancing in a port channel. The system first maps an incoming traffic flow to queues containing packets to be transmitted through a port channel at the system, the port channel including ports grouped into a single virtual port. Next, the system assigns a port from the port channel to a queue for a predetermined period of time, wherein the port is assigned to the queue based on at least one of a port state and a service history associated with the queue. The system then de-queues at least a portion of the packets in the queue through the port for the predetermined period of time. This load balancing can ensure that traffic is efficiently and fairly load balanced across the links of the port channel, and packets of each queue are not reordered.

20 Claims, 9 Drawing Sheets

(51) Int. Cl.
*H04L 12/741* (2013.01)
*H04L 29/12* (2006.01)
*H04L 29/06* (2006.01)
*H04L 12/743* (2013.01)
*H04L 12/947* (2013.01)
*H04L 12/875* (2013.01)
*H04L 29/08* (2006.01)
*H04L 12/937* (2013.01)

(56) References Cited

U.S. PATENT DOCUMENTS

| | | | |
|---|---|---|---|
| 7,103,035 B1 | 9/2006 | Kanuri | |
| 7,426,185 B1 * | 9/2008 | Musacchio | H04Q 3/68 370/235.1 |
| 7,580,409 B1 * | 8/2009 | Swenson | H04L 49/253 370/392 |
| 7,724,760 B2 * | 5/2010 | Balakrishnan | H04L 12/5693 370/230.1 |
| 8,259,571 B1 | 9/2012 | Raphel et al. | |
| 8,391,289 B1 | 3/2013 | Yalagandula et al. | |
| 2003/0174710 A1 | 9/2003 | Gooch | |
| 2004/0090913 A1 | 5/2004 | Scudder et al. | |
| 2005/0147095 A1 * | 7/2005 | Guerrero | H04L 12/1881 370/390 |
| 2006/0050632 A1 * | 3/2006 | Griggs | H04L 47/10 370/229 |
| 2007/0115982 A1 | 5/2007 | Pope et al. | |
| 2010/0287171 A1 | 11/2010 | Schneider | |
| 2011/0026403 A1 | 2/2011 | Shao et al. | |
| 2012/0207175 A1 * | 8/2012 | Raman | H04L 47/125 370/412 |
| 2014/0114995 A1 | 4/2014 | Kelley | |
| 2014/0122743 A1 | 5/2014 | Di Benedetto et al. | |
| 2014/0173129 A1 | 6/2014 | Basso et al. | |
| 2015/0124805 A1 | 5/2015 | Yadav et al. | |
| 2015/0124820 A1 | 5/2015 | Alizadeh Attar et al. | |

\* cited by examiner

RANDOMIZED PER-PACKET PORT CHANNEL LOAD BALANCING

RELATED APPLICATIONS

This application claims priority to U.S. Provisional Patent Application No. 61/900,369, filed on Nov. 5, 2013, the content of which is incorporated herein by reference in its entirety.

TECHNICAL FIELD

The present technology pertains to port channels, and more specifically pertains to load balancing traffic across a port channel.

BACKGROUND

The ubiquity of computing devices and growing demand for network data across the globe has created enormous demands for network performance improvements and complex challenges for engineers in meeting the demands and expectations of network users. Various network technologies have been developed precisely to meet this soaring demand for network data. One particular example technology involves the use of port channels, which have been implemented in various network environments with growing regularity.

Port channels are created by bundling multiple interfaces into a single virtual interface to provide higher bandwidth, load balancing, and link redundancy. For example, in some implementations, a port channel can be created using two to eight active Fast, Gigabit, or 10-Gigabit ports, with additional one to eight inactive ports configured for failover. Not surprisingly, port channels can provide great performance benefits. However, port channels can also create significant challenges in a network. And unfortunately, current solutions fail to properly correct and even address the challenges associated with port channels.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

As previously mentioned, while port channels provide great performance benefits, they also create several challenges. For example, with port channels it is often very difficult to efficiently balance traffic across the various links in the port channels. With current solutions, different flows (typically identified by a 5-tuple) are hashed across the links. This can ensure that packets of a flow are not reordered, which can avoid confusing the transport control protocol (TCP) algorithm. However, many times, this hashing approach is unsuitable for load-balancing traffic across a port channel. In particular, when the traffic consists of a few high-bandwidth flows, hashing can be a poor choice as it can result in uneven distribution of traffic and poor load balancing.

Moreover, hash collisions can cause multiple flows to get mapped to the same link while other links are idle, which may result in wasted bandwidth. Further, even when all links are fully utilized, the number of flows assigned to each link may be different, resulting in uneven and unfair traffic distribution. For example, if four 10 Gbps flows are mapped to three 10 Gbps links via hashing, in the best case, one link will have two flows (each achieving 5 Gbps throughput) and two links will have one flow each (achieving 10 Gbps throughput). Accordingly, the current solutions do not provide even load-balancing and are often unsuitable and inefficient, all which may result in performance degradation for the users.

The approaches set forth herein can be provided for performing even load-balancing across links in a port channel. As previously mentioned, port channels can be created by bundling multiple interfaces into a single virtual interface to provide higher bandwidth, load balancing, and link redundancy. In some embodiments of the current approaches, random packets can be sprayed across port channel links without re-ordering packets of a flow. Randomization can ensure that load-balancing is performed evenly and traffic is serviced fairly over time, to avoid the pitfalls of uneven and unfair management of traffic that have plagued the previous solutions.

Figure 3:
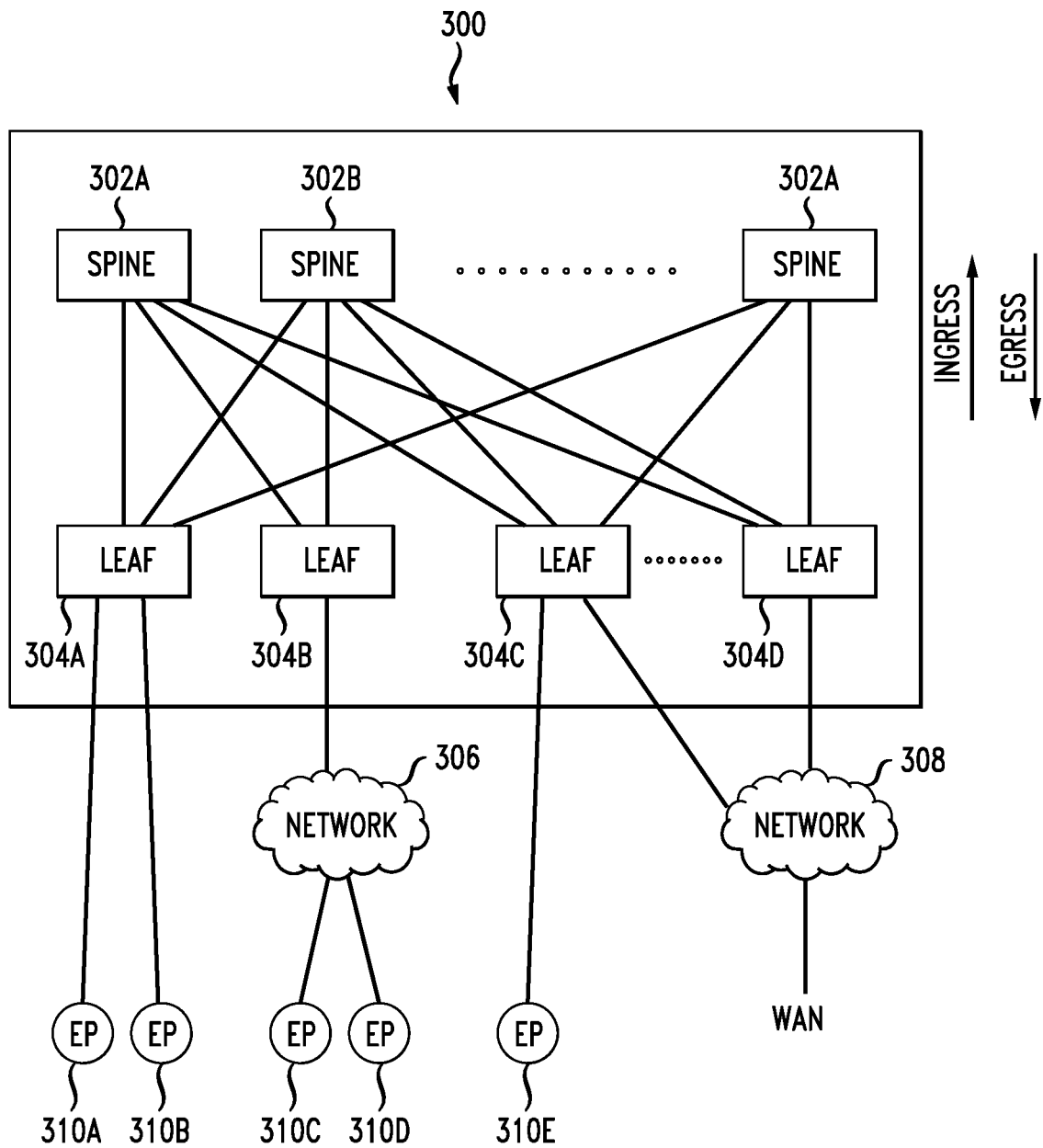
FIG. 3 illustrates an example network topology.

The port channel can be between two or more chips or ASICs within a switch or network device, such as a leaf switch (e.g., leaf switch 304$_i$ illustrated in FIG. 3, a ToR switch, a provider edge device, etc.). In some cases, the port channel can be alternatively between two or more line cards in different switches, such as different leaf or ToR switches, for example. Traffic directed to a port channel can be spread across a number of queues, with each flow (such as a 5-tuple) belonging to a queue, and each queue searching for a particular channel link in the port channel to bind to for de-queuing. Packets within a queue can be guaranteed in order delivery across the port channel, thus ensuring each flow's packets can also be delivered in order without requiring the packets arriving at different queues to be delivered in order.

As previously indicated, packet flows can be assigned to different queues. Flows can be hashed across queues, or explicitly assigned based on specific criteria. In some instances, a queue can be a virtual output queue (VOQ) that corresponds to the front panel ports of a top-of-rack (TOR) switch. Traffic destined to a front panel port can then be queued to its own VOQ. In any case, packet order can be preserved for each queue independently, but not necessarily between two queues.

In some implementations, each queue can transmit up to a speed of a single link, with a minimum required speed less than or equal to that speed. In one embodiment, each queue can transmit at up to, for example, 40 Gbps, which in some cases corresponds to the speed of the port channel links, while the required sustained speed is, for example, 10 Gbps, which can correspond to the front panel port the queue is associated with. If flows across queues are hashed, however, the number of queues can be significantly greater than the number of port channel links to ensure that all of the port channel links can be fully utilized simultaneously.

When a queue sends data on a link, the queue is "mapped" or "binded" to that link. The mapping can persist until enough time has lapsed since the end-of-packet (EOP) of the last packet sent from the queue so that the next packet can be sent on any of the port channel links without causing re-ordering. The mapping timeout value can be a parameter of the algorithm and may be relatively small (e.g., 100 s of nanoseconds), especially if the port channel is between two chips in the same device.

When more than one queue are simultaneously mapped to the same link, for example, when there are N links in the port channel and more than N queues are backlogged, an arbitration algorithm can be applied to select one of the queues to send packets using the link. This algorithm can be a standard popular algorithm, such as round robin, with a twist, for example. While a standard round robin algorithm switches back and forth between participating queues on a packet by packet basis, the randomized per-packet port channel load balancing scheme herein can implement a minimum burst timeout trigger. Here, the minimum burst value can be set to be larger than the mapping timeout value previously described.

Moreover, when a participating queue is selected to transmit, it can continue to be selected for transmitting subsequent packets until, for example, the participating queue runs out of packets to send and voluntarily drops out, or the minimum burst timeout happens. In the latter case, the other participating queues can be blocked from sending packets by the arbiter before the burst timeout. Since the burst timeout period is longer than mapping timeout value, those other queues will timeout causing them to remap to other (or the same) links without causing any packet reordering.

The modification to standard round robin type of arbitration algorithm can lead to more bursty transfers, at least for small packet sizes. In some cases, the minimum burst timeout value in a local area network environment can be relatively small compared to the maximum transmit unit (MTU) in an Ethernet network. Thus, since the network cannot guarantee maximum bursts that are less than an MTU, the difference can be unnoticeable to the user.

The mapping timeout value can be set according to, or based on, the maximum possible latency scheme along the different links in the port channel. The maximum possible latency scheme can be based on the specification of the network device(s). For example, if we have a packet A that goes through port 1, we can determine that after the packet is dequeued, it takes x amount of time for the packet to traverse the pipeline and be sent out of the port. Thus, if the EOP of the previous packet has been seen more than x in the past, then it is safe to assume that we can send the new packet on a different port since the previous packet has traversed the pipeline, so there will not be re-ordering.

Also, the ingress pipeline of the destination node, on the other end of the port channel, may require at least a certain amount of time separation for packets arriving on different input ports in order to guarantee that the packets are processed in order. In other words, it may be that if the arrival time for two packets incoming on two different links is too close in time, they may get processed out of order. In such circumstances, we can add the required time separation of the destination network device to the timeout value.

Some embodiments can map queues to port channel links. Periodically, the non-empty queues that are not mapped to a link can pick or select a link and advertise itself to that link. The picking or selecting can be random to ensure even and fair load-balancing over time, but can also be based on one or more criteria, such as a status of a link or a device; a history of a link or device, such as a service history; etc. The queues that are mapped to some link can advertise to that link. Each link can select a queue that has advertised itself to the link to create a mapping and dequeue that queue's traffic. The link can select the queue based on one or more factors, such as a current status of the queue, a priority, a service amount associated with each of the queues advertising to that link, etc. This scheduling process can be continuously repeated with a short scheduling period, such as 12 clock cycles. (e.g., ~15.6 ns). In some cases, the scheduling period can be based on the number of links in the port channel. For example, if there are 12 links in the port channel, the scheduling period can be set to 12 clock cycles to account for all the links in the port channel.

In some cases, if queues select the same link as other queues and fail to burst through the link due to arbitration, the queues can retry by randomly selecting a different link to advertise to, after they have not been able to transmit for a sufficiently long period such that any existing mapping has timed out. There can be a "hunt" phase where an unmapped queue rapidly tries a series of random links until it finds an available link it can map to. As long as the duration of the "hunt" phase is short compared to the duration of the subsequent transfer, high throughput can be achieved.

In some embodiments, there can be a number of optimization techniques to improve efficiency. For example, in randomly selecting links to advertise to, queues can prioritize or favor idle links over non-idle links. Also, when a mapping is established, the queue can be allowed to burst traffic for a sufficiently long duration on the link to not only allow significant dequeuing of traffic but also trigger remapping of any other queues also mapped to the same link. The "bursting" can in some cases reduce the overhead of the hunt phase by amortizing its cost over a longer transfer. Bursting can also ensure timeout for conflicting queues to create remapping opportunities for those queues.

Links can also analyze various factors in selecting which queue to select for transmission from those queues advertising to the link. For example, a "service counter" can be associated with each queue to track how much data the queue has sent overall. The amount of data tracked by the service counter can be used to segment queues into buckets with different priorities, where a highest priority bucket includes those queues having the lowest amount of data serviced, a lower priority bucket can include those queues having the next lower amount of data serviced, and so forth until you reach the last bucket which can include those queues having the greatest amount of data that has been serviced. Thus, when selecting a queue, the links can prioritize the buckets and first service queues in higher priority buckets. For example, a link can first look at any queues in the first bucket (highest priority), if there are any queues in that bucket, the link can service those queues first. If there are no queues in that bucket, the link can move to the next bucket, bucket number 2 with the second highest priority, and check if there are any queues in that bucket that need servicing. The link will then service any queues in that bucket (if any) or move on to the next bucket(s).

In some cases, service counters can generate tracking information for creating buckets that depend on the tracking value, which corresponds to the amount of serviced data associated with a queue. For example, queues having service counters of less than 4 KB can belong to bucket 0, queues having service counters between 4 KB and 8 KB can belong to bucket 1, etc. (note that service counters can be normalized by subtracting the smallest counter from all counters in each scheduling interval). Each idle link (or any link) can then select one or more queues (among those that advertise to it for example) from the lowest bucket in a round-robin fashion. The round-robin pointer can then "stick" to a selected queue for a programmable minimum burst duration. Thus, when a queue is selected for a link, the queue can burst until either the round-robin pointer times out and advances, or the service counter increases to a higher bucket.

In some embodiments, the burst durations can exceed the amount of time for an idle queue to be safely remapped without re-ordering. The timeout value for the round-robin pointer, as well as the size of the service counter buckets can be carefully selected based on one or more factors. Therefore, proper operation can be ensured regardless of traffic pattern.

Description

The disclosed technology addresses the need in the art for fair and efficient load balancing of port channel links. Disclosed are systems, methods, and computer-readable storage media for per-packet load balancing traffic on a port channels. The per-packet load balancing can be randomized to maintain fair and even loads, while preventing packet re-ordering, as will be further described below. First, a brief introductory description of exemplary systems and networks, as illustrated in FIGS. 1 through 4, is disclosed herein. A detailed description of load balancing traffic across links in a port channel and exemplary variations will then follow. These variations shall be described herein as the various embodiments are set forth. The disclosure now turns to FIG. 1.

Figure 1:
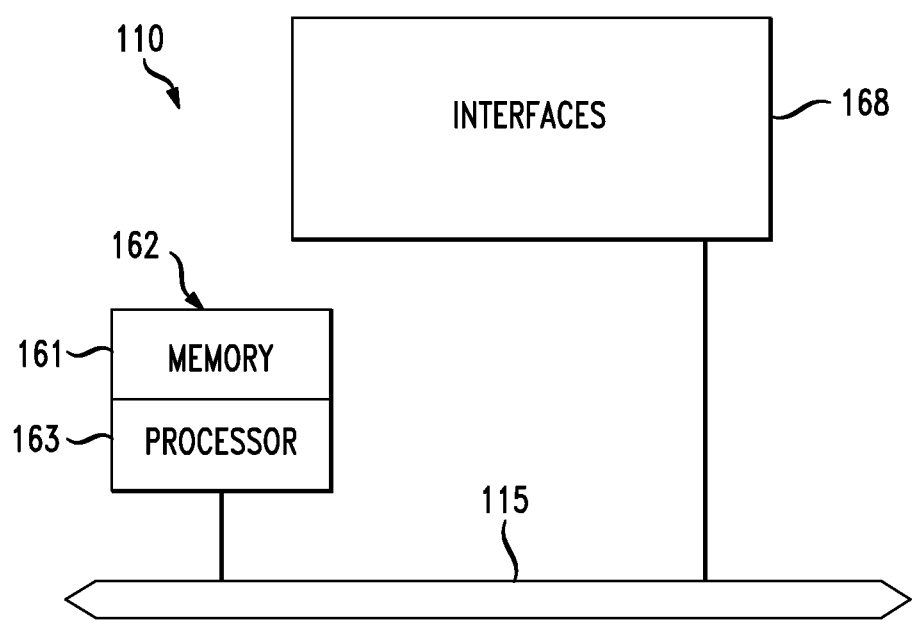
FIG. 1 illustrates an example network device, according to some aspects of the subject technology.

FIG. 1 illustrates an example network device 110 suitable for implementing the present invention. Network device 110 includes a master central processing unit (CPU) 162, interfaces 168, and a bus 115 (e.g., a PCI bus). When acting under the control of appropriate software or firmware, the CPU 162 is responsible for executing packet management, error detection, and/or routing functions, such as miscabling detection functions, for example. The CPU 162 preferably accomplishes all these functions under the control of software including an operating system and any appropriate applications software. CPU 162 may include one or more processors 163 such as a processor from the Motorola family of microprocessors or the MIPS family of microprocessors. In an alternative embodiment, processor 163 is specially designed hardware for controlling the operations of router 110. In a specific embodiment, a memory 161 (such as non-volatile RAM and/or ROM) also forms part of CPU 162. However, there are many different ways in which memory could be coupled to the system.

The interfaces 168 are typically provided as interface cards (sometimes referred to as "line cards"). Generally, they control the sending and receiving of data packets over the network and sometimes support other peripherals used with the router 110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 162 to efficiently perform routing computations, network diagnostics, security functions, etc.

Although the system shown in FIG. 1 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 2:
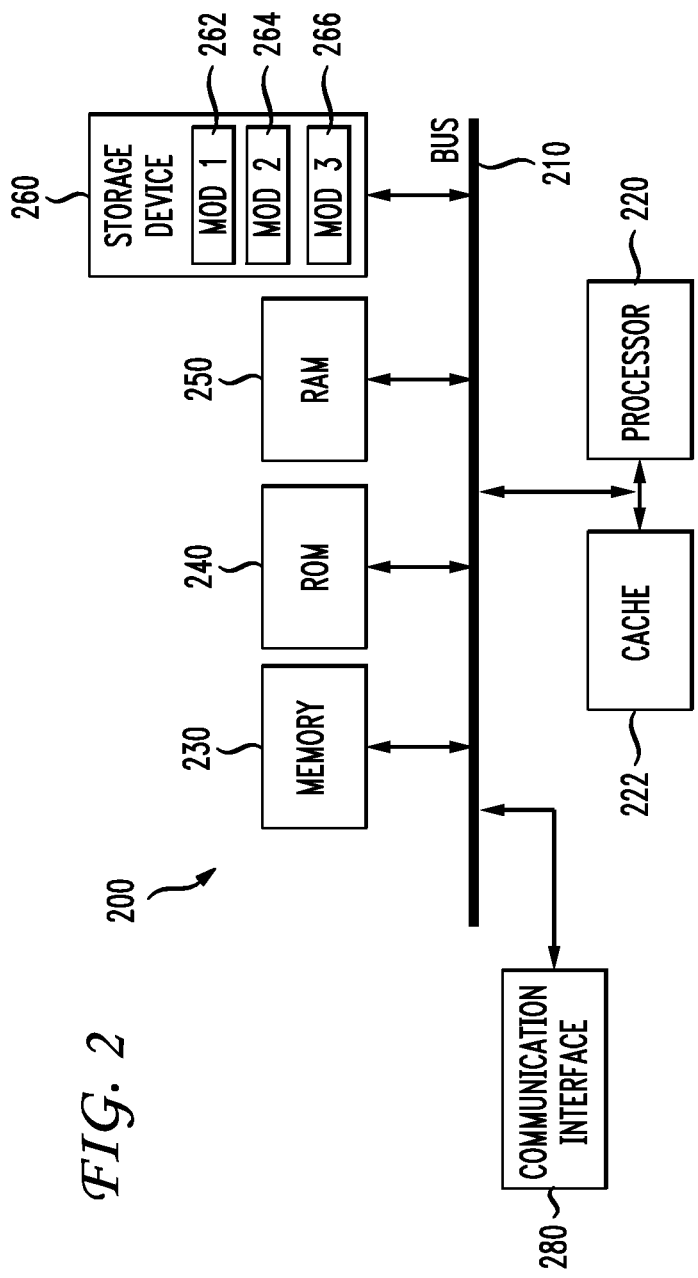
FIG. 2 illustrates an example system embodiment.

FIG. 2 illustrates exemplary possible system embodiments, such a system making up network device 110. Persons of ordinary skill in the art will also readily appreciate that other system embodiments are possible.

FIG. 2 illustrates an example computing system architecture 200 wherein the components of the system 200 are in electrical communication with each other using a bus 205. System 200 includes a processing unit (CPU or processor) 210 and a system bus 205 that couples various system components including the system memory 215, such as read only memory (ROM) 220 and random access memory (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions.

Other system memory 215 may be available for use as well. The memory 215 can include multiple different types of memory with different performance characteristics. The processor 210 can include any general purpose processor and a hardware module or software module, such as module 1 232, module 2 234, and module 3 236 stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of non-transitory computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof. The storage device 230 can include computer code and instructions which can be executed by one or more processors to perform one or more operations according to the code and instructions. For example, the non-transitory computer readable media can store instructions which, when executed by a processor, causes the processor to perform operations defined in the instructions.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, display 235, and so forth, to carry out the function.

FIG. 3 illustrates an example network topology 300. The network topology 300 can include spine switches 302A, 302B, . . . , 302C (collectively "302"). The spine switches 302 can be Layer 3 switches connected to leaf switches 304A, 304B, 304C, . . . , 304D (collectively "304") in the topology 300. In some cases, the spine switches 302 can be configured to host a proxy function that performs a lookup of the endpoint address identifier to locator mapping in a mapping database on behalf of leaf switches 304 that do not have that mapping. The proxy function can do this by parsing through the packet to the encapsulated, tenant packet to get to the destination locator address of the tenant. It can then perform a lookup of its local mapping database to determine the correct locator address of the packet and forward the packet to the locator address without changing certain fields in the header. Also, the spine switches 302 can support 40 Gbps Ethernet.

When a packet is received at a spine switch $302_i$, the spine switch $302_i$ can first check if the destination locator address is a proxy address. If so, the spine switch $302_i$ can perform the proxy function as previously mentioned. If not, the spine switch $302_i$ can lookup the locator in its forwarding table and forward the packet accordingly.

The leaf switches 304 may reside at the edge of the network topology 300 (i.e., the edge of the fabric) and can contain the virtual tunnel endpoint (VTEP) function. The leaf switches 304 can also be responsible for routing or bridging the tenant packets and applying network policies.

Network connectivity in the network topology 300 can flow through the leaf switches 304. In fact, in general, the spine switches will only connect to leaf switches 304. Accordingly, any connections to external networks or servers, such as networks 306 and 308, will flow through the leaf switches 304.

In some cases, a leaf switch may only perform routing functions. However, in other cases, a leaf switch can perform one or more additional functions, such as implementing a mapping cache, sending packets to the proxy function when there is a miss in the cache, encapsulate packets, enforce ingress or egress policies, etc.

The endpoints 310A-E (collectively "310") can connect to the network topology 300 via leaf switches 304. For example, endpoints 310A and 310B can connect directly to leaf switch 304A. Similarly, endpoint 310E can connect directly to leaf switch 304C.

On the other hand, endpoints 310C and 310D can connect to leaf switch 304B via network 306. Similarly, the wide area network (WAN) can connect to the leaf switches 304C or 304D via network 308. Networks 306 and 308 can be public and/or private networks. In some cases, network 306 can be a Layer 2 network, and network 308 can be a Layer 3 network, for example.

Figure 4A:
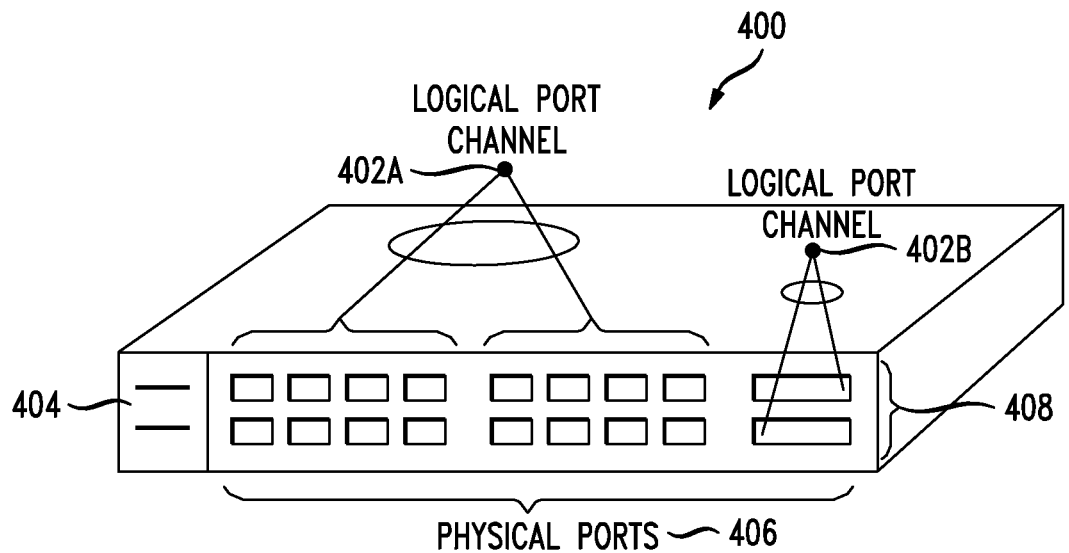
FIGS. 4A and 4B illustrate example switches configured with logical port channels.
Figure 4B:
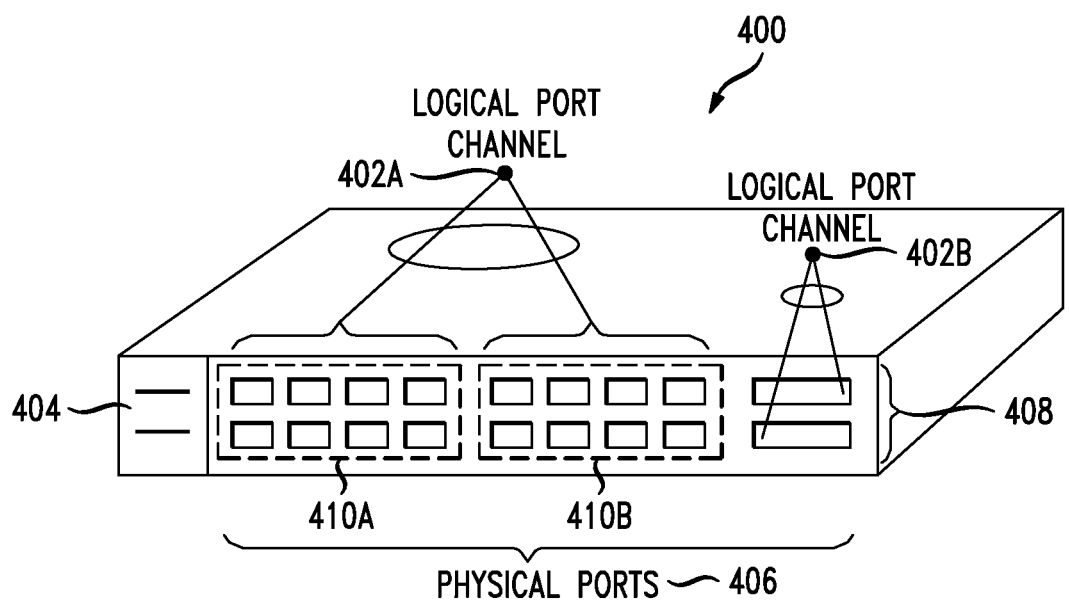
Figure 4C:
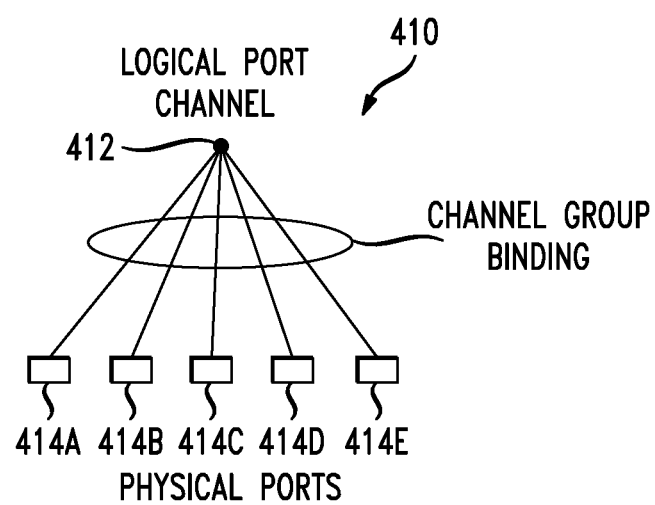
FIG. 4C illustrates a schematic block diagram of an example logical port channel configuration.

FIGS. 4A-C illustrate example configurations of logical port channels. Referring to FIG. 4A, this figure illustrates an example switch 400 having example port channel configurations. The switch 400 can include multiple physical ports 406 and port modules 408 in the front panel 404. The physical ports 406 can be grouped together to form a single, logical port channel 402A. Thus, the port channel 402A can be by bundling multiple interfaces in the switch 400 into a single virtual interface to provide higher bandwidth, load balancing, and link redundancy. For example, in some implementations, a port channel can be created using two to eight active Fast, Gigabit, or 10-Gigabit ports, with additional one to eight inactive ports configured for failover.

As previously mentioned, the switch 400 can also include port modules 408. Both of the port modules 408 can be similarly grouped together into a single, logical port channel 402B to provide higher bandwidth, load balancing, and link redundancy. Thus, the port channel 402B can be treated as a single channel even though it includes multiple links. Traffic through the port channel 402B can be routed through any of its links. If a particular link is down, traffic can still flow through any of the remaining links to avoid or minimize any downtime.

Referring to FIG. 4B, the switch 400 can include two chips 410A and 410B (e.g., ASICs). Here, the port channel 412 can be formed between the two chips 410A and 410B in the same device (i.e., switch 400). Chip 410A can connect to a subset of the ports 406 and chip 410B can connect to another subset of the ports 406. The two chips 410A and 410B can then be connected to each other through the port channel 412, which is based on the number of links according to the ports 406. As such, traffic across the switch 400, including traffic across the two chips 410A and 410B, can be load balanced when the two chips 410A and 410B need to communicate and/or when another device needs to communicate with one or more of the two chips 410A and 410B.

In some embodiments, there can be two separate chips (or ASICs) within the same leaf switch $304_i$. Each chip or ASIC can be connected to a subset of the external physical ports in the leaf switch $304_i$. For example, one ASIC may connect to the uplink ports (towards the spine switches 302), and one ASIC may connect to the front-panel ports (towards the server, hosts, or VMs). The two ASICs can then be connected to each other through port channel 412 with a number of specific links, such as 12 40 Gbps links, for example. Traffic across this internal port channel can then be load balanced when the two chips or ASICs need to communicate.

While FIGS. 4A and 4B are described with respect to one and two chips or ASICs in a same device (e.g., switch) used to form a logical channel, one of ordinary skill in the art will readily recognize that the same concept can be applied on devices with more than two chips or ASICs. For example, a network device, such as a switch, with three chips or ASICs can similarly have external ports connected to the three chips or ASICs, which can then be used to form a logical channel on the network device based on the external ports connected to the three chips. Thus, traffic can be load balanced using the logical channel when the chips need to communicate. Indeed, devices with additional chips or ASICs to form one or more logical channels for load balancing are also contemplated herein.

FIG. 4C illustrates a schematic diagram 410 of an example logical port channel 412. The schematic diagram 410 illustrates the example logical port channel 412. As illustrated, the port channel 412 is formed based on physical ports 414A-E (collectively "414"). Here, the multiple, physical ports 414 can be grouped together to form a single, virtual port channel to handle traffic. In some cases, multiple port channels can also be grouped together into a single port channel group to expand the bandwidth, redundancy, load balancing, and overall capabilities of the associated physical ports.

Traffic can then be transmitted through the port channel 412 and distributed through the physical ports 414 that make up the port channel 412. This way, the bandwidth of the physical ports 414 can be shared to form a single, powerful logical port, and the various ports 414 can provide the necessary redundancy to ensure that failure of one or two ports does not cause a network failure, downgrade, or disruption. However, as the amount of traffic transmitted through the port channel 412 increases, it becomes increasingly important to properly balance the load of traffic among the physical ports 414 which make up the port channel 412. Often times, traffic through a port channel is not properly balanced, which results in one or more ports handling a disproportionate amount of load vis-à-vis the remaining ports in the port channel. This can create many problems, such as service degradation, inefficiency, unfairness, and even disruption.

To this end, as further described herein, the load of the physical ports 414 can be evenly, efficiently, and fairly distributed using random, per-packet load balancing. For example, as traffic is received, the packets, flows, or traffic can be placed in queues to be serviced by the port channel 412. The queues can randomly advertise their loads to the ports 414 in the port channel 412 until a port accepts the queue. The queue is then mapped to the port and serviced by the port. The queue can consequently de-queue by sending a burst of data for a predetermined period of time. As the number of queues increases, the randomization of the selection of ports to advertise or query can create a greater balance and fairness. In addition, specific criteria followed by both the queue in advertising its load and the ports 414 and selecting queues to service, can also increase the efficiency of the load balancing process, by prioritizing the selection of ports and servicing of queues, as further described herein.

Figure 5:
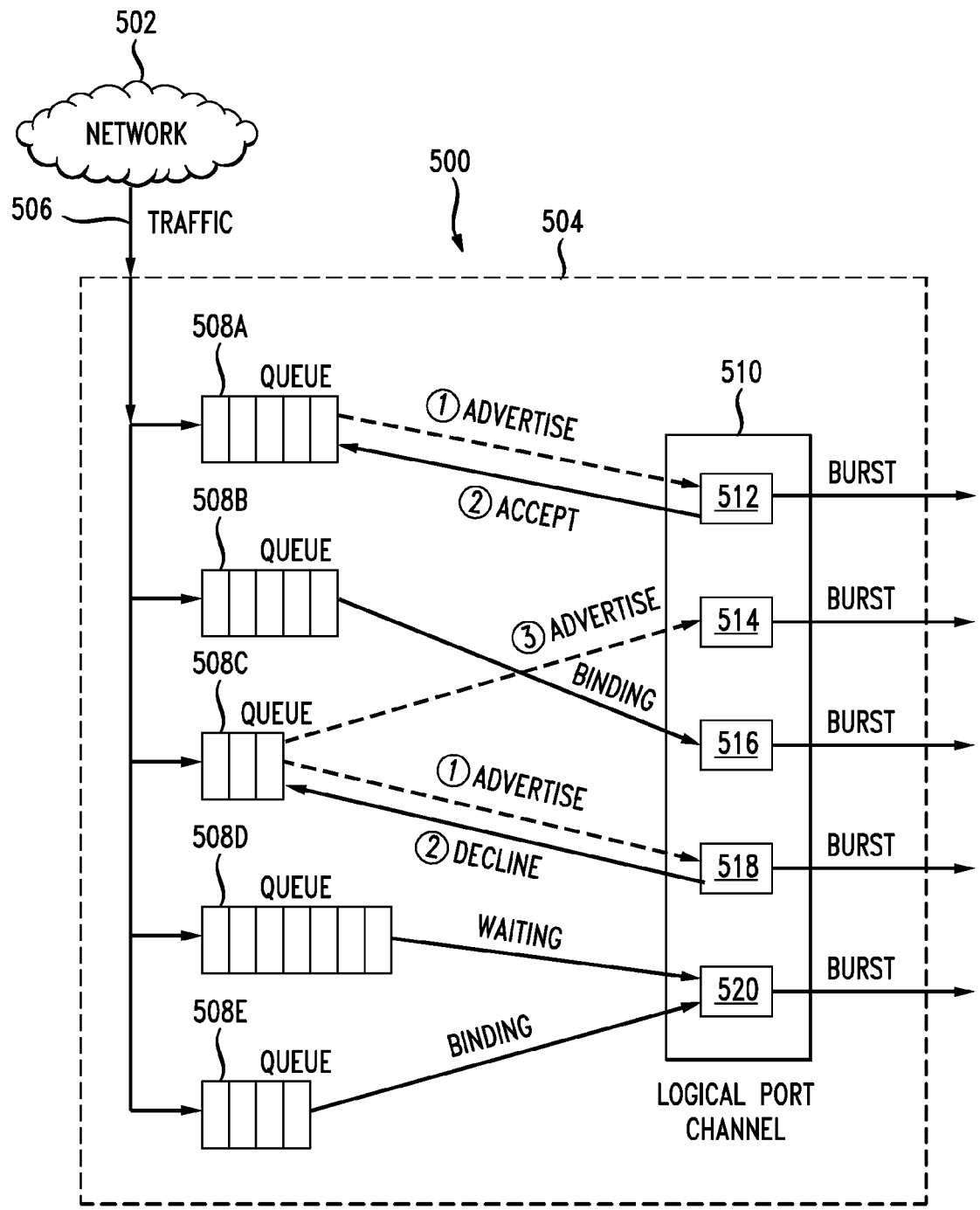
FIG. 5 illustrates an example system for port channel load balancing.

Turning now to FIG. 5, this figure illustrates an example architecture 500 for load balancing traffic 506 in a port channel 510. The traffic 506 can be received by the network device 504 from a network 502, such as a private, public network, and/or logical network. The network device 504 can be a switch or a router with front panel ports for creating a port channel 510, for example. The network device 504 can receive the traffic 506 and create queues 508A-E (collectively "508") for the traffic 506. The queues 508 can include one or more packets, a TCP flow, a sequence of packets, a stream, traffic designated to a specific device, etc. In some cases, each of the queues 508 include all traffic received that is designated to a device associated with the particular one of the queues 508. For example, queue 508A can include all traffic designated to go to a specific application server. Thus, all the traffic for that server is queued in the queue 508 and transmitted through the port channel 510 using the load balancing techniques described herein.

Moreover, packet order can be preserved at the other end of port channel 510 on a per queue 508 basis; that is, if packet X arrives in queue 508A before packet Y, the other end of port channel 510 can receive packet X before packet Y. However, if packets X and Y are classified in two different queues, for example queue 508A and queue 508B, respectively, the order in which the packets are received at the other end of port channel 510 can be arbitrary.

The queues 508 then advertise themselves to one or more of the ports 512-520 from the port channel 510. In some cases, a queue can randomly select one of the ports 512-520 and advertise itself to that port. The port can then provide an answer to the queue, which defines whether the queue is selected to transmit out of that port or must continue advertising itself to other ports until it finds a match. Thus, if the port accepts the queue, the queue is then mapped to the port and can burst its traffic through that port, at least for a predetermined period of time. On the other hand, if the port denies the queue, the queue will then randomly select a different port to advertise to and so on until it finds a port that accepts the queue.

For example, queue 508A can first advertise itself to port 512. Here, queue 508A can randomly select port 512 when advertising to it. In some cases, however, when randomly selecting a port to advertise to, a queue can prioritize ports that are idle over those that are not idle. This way, the queue can randomly advertise to idle ports (which are more likely to be able to handle the load), in a random fashion until it finds a match. If no ports are currently idle, the queue can advertise itself to the non-idle ports in the same way, and continue until it finds a match.

Port 512 can then accept queue 508A, and queue 508A can burst traffic through port 512. Queue 508A can burst traffic for at least a predetermined period of time. The period of time can be long enough to ensure that if another queue, for example queue 508B, that is also mapped to the port 512 behind the queue 508A, but is not currently selected to transmit on port 512 (for example, due to queue 508B running out of data or exceeding its minimum burst threshold after the previous transfer on port 512), will timeout and seek to map to a different port. In some cases, the mapping timeout period can be based on a maximum latency scheme, which can be the latency time it would take for a communication to traverse the pipeline of the switch 504 from the queue until the output. This way, the timeout can exclude the possibility of a packet transmitted on an alternative link from getting ahead of a previous packet transferred on port 512. Further, if the destination node on the other end of the port channel requires a minimum time separation between packets arriving on different links to ensure they are processed in order of arrival, then this time separation must also be added to the mapping timeout period Queues 508B and 508E can be mapped to ports 516 and 520, respectively, such that any queues looking to advertise themselves to the ports can see that ports 516 and 520 are not idle and thus should not be prioritized, or perhaps even advertised to. Since queues 508B and 508E are mapped to ports 516 and 520, respectively, they can begin bursting traffic through their mapped ports for the configured burst period.

In some cases, queue 508D can advertise to port 520, which is already mapped to queue 508E, and receive an acceptance from port 520. Here, queue 508E will block queue 508D as it is already mapped to port 520 and bursting. Accordingly, queue 508E can wait for a timeout period to see if port 520 becomes available and begins servicing queue 508D. The timeout period can be a value corresponding to the maximum possible latency scheme along the different parts or components in the port channel 510, which can include any input and output chips in the switch 504 in the path or pipeline of the traffic through the port channel 510. If the port 520 becomes available before the timeout period, then queue 508D can simply begin bursting traffic through port 520.

On the other hand, if port 520 does not become available before the timeout period, then the queue 508D can begin advertising itself to other ports in the port channel 510 in an effort to find an available port to map to and burst traffic from. For example, in some cases, if port 520 is not available after the timeout period, then queue 508D can randomly advertise to one of ports 514 or 518, which may receive priority because these ports are currently not mapped to a specific queue and are therefore idle. In other cases, if port 520 is not available after the timeout period, then queue 508D can randomly select one of ports 512-518 to advertise itself to in order to find a new port to map to.

Queue 508C can similarly advertise itself to port 518. If port 518 accepts queue 508C, then queue 508C can map to port 518 as previously explained and begin bursting traffic. By contrast, if port 518 declines queue 508C, then queue 508C can move on and advertise to another randomly selected port, such as port 514, in order to try to find a new port to map or bind to. Port 514 can then make a decision as to accept or deny queue 508C.

As previously discussed, ports can use one or more factors or criteria to determine whether to accept or reject a mapping request from a queue. For example, ports can analyze the type or number of contents in the different queues, the originating devices, the destination devices, the service history for each of the queues, specific system or user preferences, etc. In some embodiments, the ports analyze a service counter to determine which queues to accept. The service counter can track the amount of data that is serviced for each queue and generate a value representing the queue's service value. The ports can then prioritize queue's with lower service values over those with higher service values.

In some cases, the service counter can identify a service value for each queue and group the different queues by service values. For example, group 1 can include all queues having received service for less than 4 KB of data, group 2 can include all queues having received service for between 4 KB and 8 KB of data, group 3 can include all queues having service received for between 8 KB and 12 KB of data, and so forth. Thus, in selecting a queue to service, a port can first look in group 1 for any queues in that group. The port can then select any queues from group 1. If there are no queues in group 1, or if all queues in group 1 have been selected, the port can then look at group 2 and start selecting any queues in group 2 until it is time to move to group 3. The port can continue prioritizing queues based on their service counter groups in this way to ensure that loads are balanced evenly and fairly. Queues can also advertise to ports randomly to further ensure even distribution of loads and service opportunities, but can also prioritize idle port over non-idle ports, as previously explained, to increase load balancing fairness and efficiency.

Figure 6:
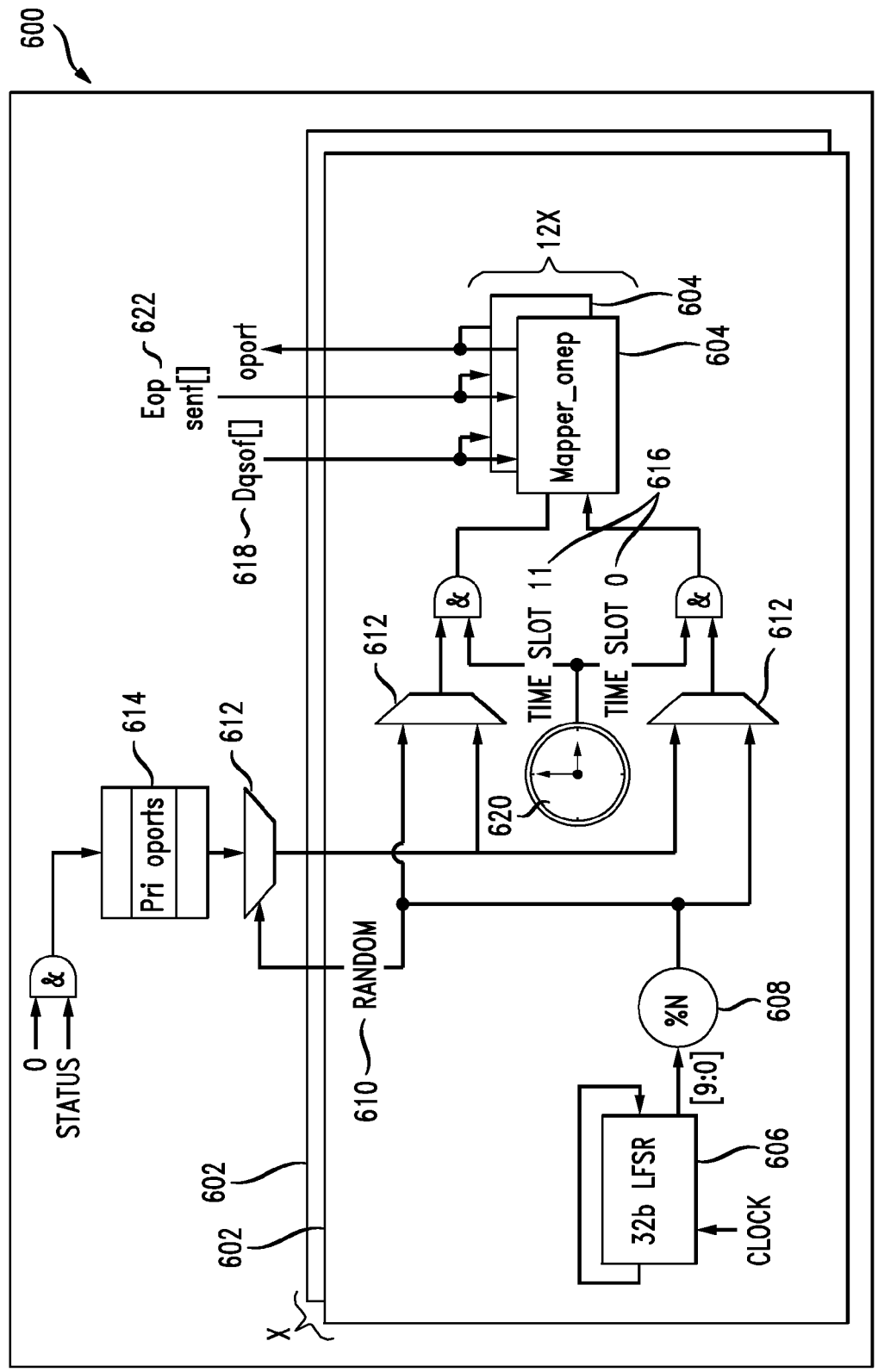
FIG. 6 illustrates an example mapping block diagram according to various embodiments of the present technology.

FIG. 6 illustrates an example mapping block diagram 600 according to various embodiments of the present technology. The dynamic mapping logic can handle many sets of mappers 602. In some embodiments, the dynamic mapping logic handles 96 sets of mappers, which are divided into 8 groups of 12 mappers 602. Within each group (mapper_twelvep), the individual mappers 604 can share a linear feedback shift register (LFSR) 606 in a time-division multiplexing (TDM) fashion, for example. In some case, each mapper 604 can map once every 12 clocks due to the per outbound port (oport) advertising rate to Scheduling Controller Architecture (SCX) units. The LFSR 606 in each group of mappers 602 can use a unique polynomial in order to ensure they are uncorrelated. Any number of links up to 12 can be supported.

Moreover, ports 612 are picked at random 610. In order to pick random ports evenly, a relatively large 10 bit random number can be modulo divided by N 608. Further, when there are priority oports 614, N can be equal to the number of priority oports 614. When no priority oport is present, N can be equal to the number of operational links. If there are N valid queues and M operational links, the mapping logic can attempt to map N/M queues for each link by using the random process.

The mapping logic can assign the oport for each packet dynamically. Two packets in the same queue can be assigned to different links, though the FIFO semantics of a queue can still be maintained by allowing the packets to dequeue serially. Moreover, for a particular packet, the oport assignment may not be fixed. Mapping logic can assign oport X to the packet at first and, after a period of time that the SCX has not serviced the packet, a different oport can be assigned to the packet instead in order to take advantage of available bandwidth.

The dynamic mapping can involve parallel processing. Each front panel port can have a dedicated thread calculating link/oport values. This can allow the solution to scale to large number of queues and support 40 GB link line rate with ease.

Since threads can operate in parallel, inter-dependence can be kept to a minimum to prevent stalling. For example, for each thread to pick a port randomly with 1/N probability of picking any particular link out of N, thereby assuming that processes can be uncorrelated, achieving even distribution statistically.

Once the mapping logic picks an oport, the queue can advertise active status on the device. The status bus can be time slot 616 based. For example, in twelve clock information related to a particular oport can be updated. A queue that is mapped to an oport can be maintained active in that oport's slot once every twelve clocks until it is picked for dequeue, unless the mapping logic decides to remap.

After a queue is mapped to an oport and advertised, it can be selected for dequeue. The mapping logic can monitor the decision of Dqsof bus 618. However, if a queue is not selected for a period of time, it is free to remap to a less congested oport.

Remapping can be done according to an arrival of packets. An internal timer 620 can keep track of the amount of idle time that has transpired since the last end of packet (EOP) sent 622 for the queue. When the timer 620 value is large enough, it can be safe to send the next packet via a different link without a risk of re-ordering the packets.

The timeout threshold can be set high enough to match or exceed the worst case skew packet data may experience by going on different links.

Remapping can also occur if the queue becomes empty so that long period of time passes without transmission. When the queue becomes valid again, the timer has expired and the logic can select a different oport.

A priority oport can include a link that is currently idle (i.e., not in the process of transmitting a packet) or there are no other queues mapped and/or advertised to it. While the mapping algorithm can use random selection of oports, it can also attempt to map to a priority oport first when such is available. If there are currently more than one priority oport available, one of them can be selected randomly.

Due to parallel processing, each set of queues can select its mapping without being aware of the concurrent state of other sets of queues. As a result, this multiple sets of queues can see the same oport as a priority oport, and attempt to map to it simultaneously. However, this inefficient would only be transient, as only one of the queues would be served by the priority oport, while the others will timeout and remap to a different link.

Figure 7:
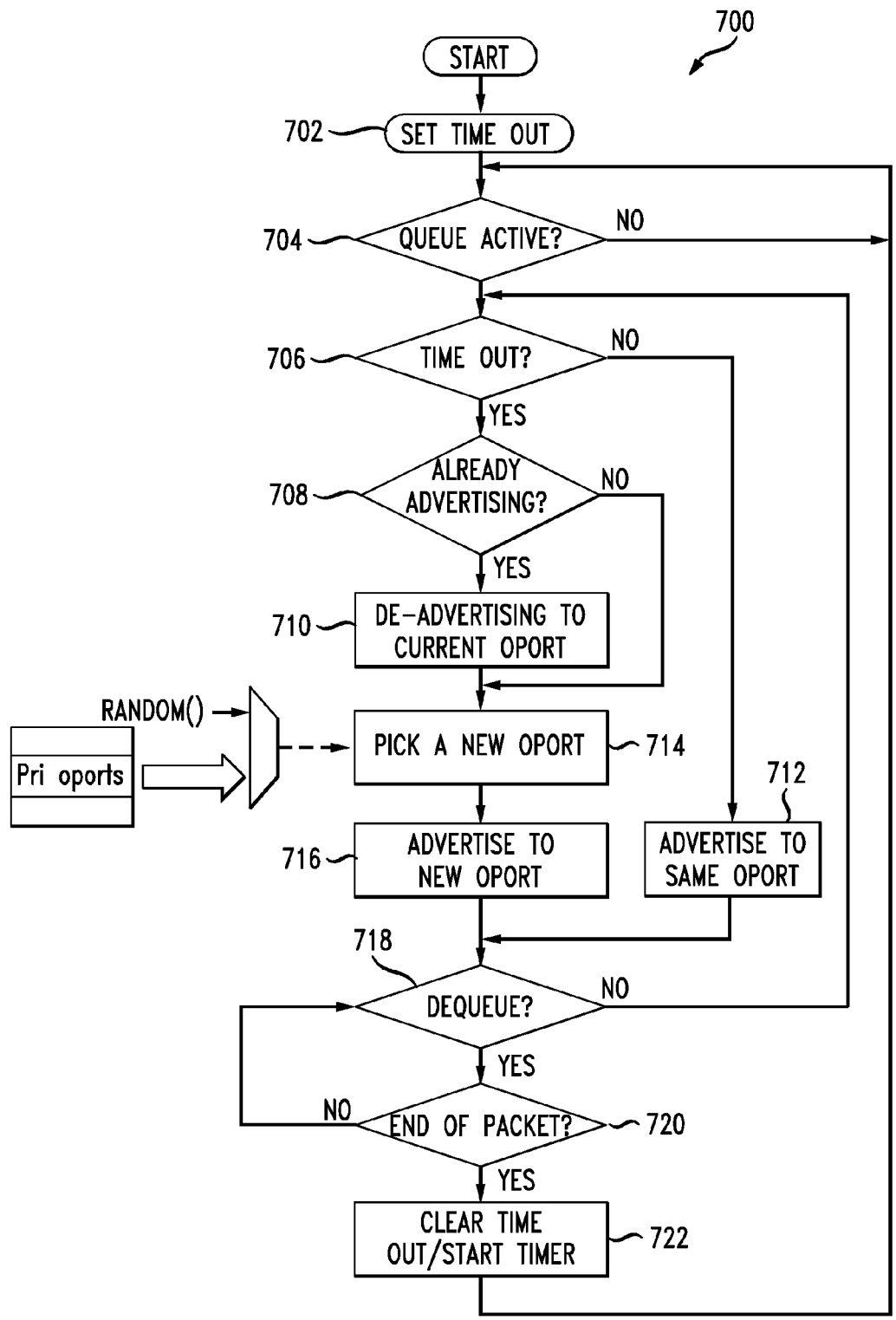
FIG. 7 illustrates an example mapping flowchart.

FIG. 7 illustrates an example mapping flowchart 700. At step 702, a timeout value is set for the queue. As previously explained, the timeout value can be based on a maximum latency scheme associated with the system, which can be calculated based on the specification of the system, including the speed of any chips or ports in the pipeline across the various ports. Moreover, the timeout value corresponds to the amount of time a queue will wait for a mapped oport before it attempts to remap.

At step 704, the queue checks if it is active. If no, the queue can re-check until the queue becomes active. Alternatively, if no, the queue checks if the timeout has been exceeded at step 706. If the timeout has not been exceeded, at step 712, the queue advertises to the same oport, and later moves to step 718 discussed later.

If the timeout has been exceeded, at step 708, the queue determines if it is already advertising itself. If already advertising, at step 710, the queue de-advertises to the current oport. On the other hand, if not already advertising, at step 714, the queue picks a new oport. If any priority oports are available, the queue will first try to randomly pick an available priority oport. However, if no priority oports are available, the queue will randomly pick any oport. Once the queue has picked a new oport, at step 716, the queue advertises to the new oport and follows to step 718.

At step 718, once the queue is mapped to an oport, the oport can dequeue the queue. At step 720, the oport checks if the dequeuing has reached an end of packet (EOP). If no, the oport continues checking until the dequeuing has reached the EOP. At step 722, once the dequeuing has reached the EOP, the system clears the timeout and/or start timer. The process can then continue with the new set of queues.

Figure 8:
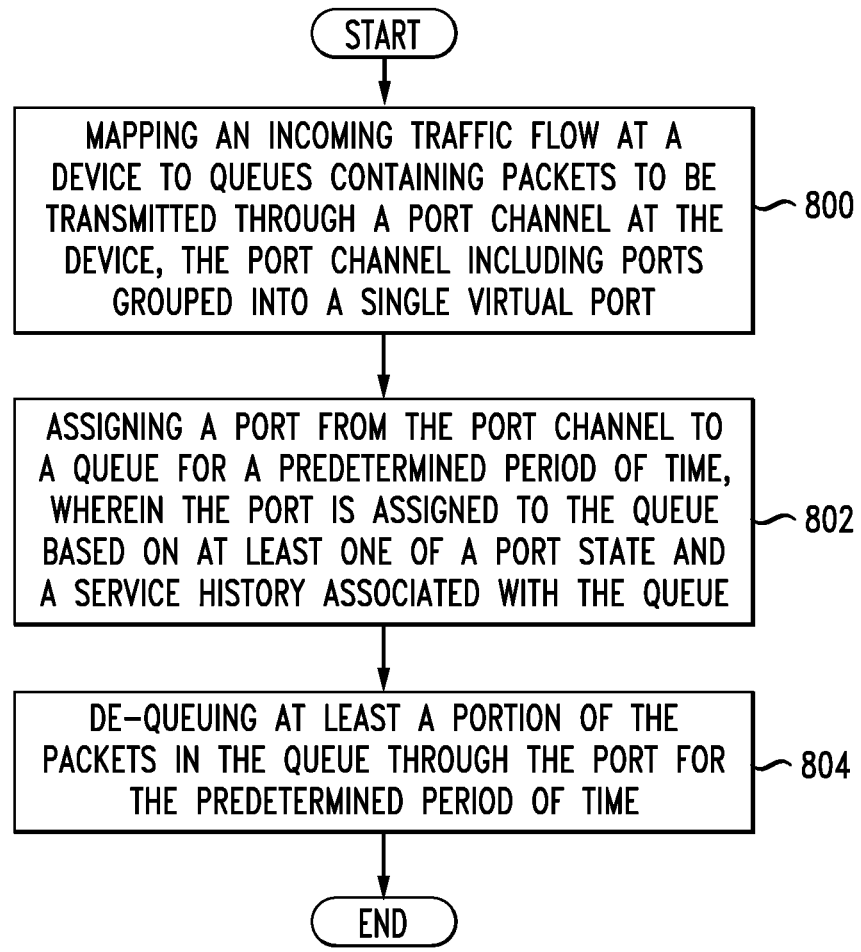
FIG. 8 illustrates an example method embodiment.

Having disclosed some basic system components and concepts, the disclosure now turns to the exemplary method embodiment shown in FIG. 8. For the sake of clarity, the method is described in terms of a system 110, as shown in FIG. 1, configured to practice the method. The steps outlined herein are exemplary and can be implemented in any combination thereof, including combinations that exclude, add, or modify certain steps.

The system 110 first maps an incoming traffic flow to queues containing packets to be transmitted through a port channel at the system 110, the port channel including a plurality of ports grouped into a single virtual port (800). The system 110 then assigns a port from the port channel to a queue for a predetermined period of time, wherein the port is assigned to the queue based on at least one of a port state and a service history associated with the queue (802). The port state can be, for example, idle state or non-idle state. Moreover, the service history can refer to the amount of service the queue has received in the past. In some embodiments, a service counter can be implemented to count or track any servicing to queues in the system 110 to allow the system 110 to determine the service history of any particular queue. In some cases, if the queue has been serviced a lot, the port may select a different queue that has received less servicing or otherwise prioritize the less serviced queues. On the other hand, if a queue has not been serviced very much, the port can prioritize that queue over queues that have been serviced more or longer.

Next, the system 110 de-queues at least a portion of the packets in the queue through the port for the predetermined period of time (804). Here, the system 110 can burst or output the data in the queue for at least the predetermined period of time. In some cases, the predetermined period of time can be larger than a timeout period configured for queues to initiate a reassigning to a port after waiting to be serviced for the timeout period. Thus, if the system 110 is servicing the queue for the predetermined period of time, any other queues that may have also been mapped to that same port, will remap upon the timeout period being exceed to avoid wasting time waiting for the de-queuing to complete and to make use of other, available ports or bandwidth.

The port from the port channel can be assigned to the queue based on a mapping process. The mapping process can include the queue randomly selecting the port to advertise to it, and subsequently advertising itself to it. The port then receives the advertising and determines whether to accept the queue for servicing by the port. The port can make this determination based on one or more factors, such as the service history of the queue, the status of the port, the size of the queue, the service history of other queues, the service history or availability of other ports, etc. Once the port makes a determination, it can send a response to the queue. If the response is an acceptance, the queue can map to the port and use the port to de-queue. By contrast, if the response is a rejection, the queue can randomly re-advertise itself to another port and wait for a response from the other port. Throughout the mapping process, the queue also checks the timeout period to determine if it has waiting too long for a port. If a timeout period is indeed exceeded, the queue can re-advertise itself to another randomly-selected port, or even the same port.

For clarity of explanation, in some instances the present technology may be presented as including individual functional blocks including functional blocks comprising devices, device components, steps or routines in a method embodied in software, or combinations of hardware and software.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

We claim:

1. A method comprising:
   mapping, by a network device, an incoming traffic flow to queues containing packets to be transmitted through a port channel at the network device, the port channel comprising a plurality of ports grouped into a single virtual port;
   assigning, by the network device, a port from the port channel to a queue of the queues for a predetermined period of time, wherein the port is assigned to the queue based on at least one of a port state and a service history associated with the queue;
   assigning a timeout period for the queue;
   determining that the queue is active;
   determining that the timeout period has not been exceed;
   advertising the queue to the port; and
   de-queuing, by the network device, at least a portion of the packets in the queue through the port for the predetermined period of time.

2. The method of claim 1, wherein the port state comprises one of idle or non-idle, and wherein the service history comprises an amount of traffic serviced for that queue by the port channel as defined by a service counter.

3. The method of claim 1, wherein assigning the port from the port channel to the queue comprises:
   selecting the port from the plurality of ports in the port channel for advertising the queue to the port;
   advertising the queue to the port to request assignment of the port to the queue for de-queuing the queue through the port; and
   accepting an assignment of the port to the queue based on the service history associated with the queue.

4. The method of claim 3, wherein the port is selected randomly.

5. The method of claim 4, further comprising grouping the queues into priority groups based on a respective service count of each of the queues, wherein accepting the assignment is based on a priority group associated with the queue.

6. The method of claim 5, wherein the priority groups are defined by respective ranges of serviced data, wherein a priority group having a lower range of serviced data is assigned a higher priority than priority groups having a higher range of serviced data.

7. The method of claim 5, wherein the port selects the priority group associated with the queue based on a respective priority of the priority group with respect to other priority groups, and wherein the port selects queues in the priority group for servicing based on a round-robin scheduling.

8. The method of claim 1, wherein the predetermined period of time is larger than the timeout period assigned for the queues when waiting for service from an assigned port, and wherein the port channel is between two or more chips at the network device, each of the two or more chips being connected to a subset of external physical ports.

9. The method of claim 1, wherein assigning the port from the port channel to the queue comprises:
   sending a first request for assignment of the queue to a different port from the plurality of ports in the port channel;
   based on the first request, assigning the queue to the different port;
   detecting that the queue has not received service from the different port within the timeout period;
   after the timeout period, sending a second request for assignment of the queue to the port; and
   receiving an acceptance of the request, the acceptance assigning the queue to the port.

10. The method of claim 1, further comprising: determining that the queue has waited for servicing from a mapped port for over the timeout period; advertising the queue to a new port based on the timeout period being exceeded, wherein the new port is the port from the port channel; receiving an acceptance to the advertising from the new port; and assigning the new port to the queue based on the acceptance.

11. A system comprising:
    a processor; and
    a computer-readable storage medium having stored therein instructions which, when executed by the processor, cause the processor to perform operations comprising:
       mapping an incoming traffic flow at the system to a queue configured to transmit the incoming traffic flow in the queue through a port channel on the system, the port channel comprising a plurality of ports grouped into a single virtual port;
       selecting a port from the plurality of ports to receive a request for an assignment of the queue to the port;
       mapping the queue to the port for a predetermined period of time, wherein the queue is mapped to the port based on at least one of a port state and a service history associated with the queue;
       assigning a timeout period for the queue;
       determining that the queue is active;
       determining that the timeout period has not been exceed;
       advertising the queue to the port; and
       de-queuing at least a portion of packets in the queue through the port for the predetermined period of time.

12. The system of claim 11, the computer-readable storage medium storing additional instructions which, when executed by the processor, result in an operation further comprising: based on the selecting of the port, sending a query to the port requesting a mapping of the queue to the port.

13. The system of claim 12, the computer-readable storage medium storing additional instructions which, when executed by the processor, result in operations further comprising: receiving an acceptance to the query; and mapping the queue to the port based on the acceptance.

14. The system of claim 12, the computer-readable storage medium storing additional instructions which, when executed by the processor, result in an operation further comprising:

receiving a rejection to the query;
based on the rejection, sending a second query to a second port requesting the mapping of the queue to the second port, wherein the second port is selected randomly from the plurality of ports;
receiving an acceptance of the second query from the second port; and
mapping the queue to the second port based on the acceptance.

15. The system of claim 11, wherein the port state comprises one of idle or non-idle, and wherein the service history comprises an amount of traffic serviced for that queue by the port channel as defined by a service counter.

16. The system of claim 11, wherein the port is selected randomly from the plurality of ports, and wherein the selecting is configured to prioritize non-idle ports over idle ports.

17. A non-transitory computer-readable storage medium having stored therein instructions which, when executed by a processor, cause the processor to perform operations comprising:
mapping, by a network device, an incoming traffic flow to queues containing packets to be transmitted through a port channel at the network device, the port channel comprising a plurality of ports grouped into a single virtual port;
assigning, by the network device, a port from the port channel to a queue of the queues for a predetermined period of time, wherein the port is assigned to the queue based on at least one of a port state and a service history associated with the queue;
assigning a timeout period for the queue;
determining that the queue is active;
determining that the timeout period has not been exceed;
advertising the queue to the port; and
de-queuing, by the network device, at least a portion of the packets in the queue through the port for the predetermined period of time.

18. The non-transitory computer-readable storage medium of claim 17, storing additional instructions which, when executed by the processor, result in operations further comprising:
selecting the port from the plurality of ports in the port channel for advertising the queue to the port;
advertising the queue to the port to request mapping of the port to the queue for de-queuing the queue through the port; and
accepting a mapping of the port to the queue.

19. The non-transitory computer-readable storage medium of claim 17, wherein the port is selected randomly, and wherein the selecting is configured to prioritize non-idle ports over idle ports.

20. The non-transitory computer-readable storage medium of claim 17, wherein accepting the mapping is based on at least one of a port state and a service history associated with the queue, wherein the port state comprises one of idle or non-idle, and wherein the service history comprises an amount of traffic serviced for that queue by the port channel as tracked by a service counter.

* * * * *